(12) United States Patent
Rosemore et al.

(10) Patent No.: US 7,850,075 B1
(45) Date of Patent: Dec. 14, 2010

(54) HIGH-SPEED AND HIGH-VOLUME ORDERING, MANUFACTURING/PACKAGING, AND DELIVERY OF PURCHASE CARDS

(75) Inventors: Timothy Rosemore, Mountain View, CA (US); Jim Owings, Gainesville, GA (US)

(73) Assignee: Intuit Inc., Mountain View, CA (US)

( * ) Notice: Subject to any disclaimer, the term of this patent is extended or adjusted under 35 U.S.C. 154(b) by 1171 days.

(21) Appl. No.: 11/496,997

(22) Filed: Jul. 31, 2006

(51) Int. Cl.
*G06K 5/00* (2006.01)
*G06K 7/08* (2006.01)
*G06Q 40/00* (2006.01)

(52) U.S. Cl. .................. 235/380; 235/382; 235/449; 235/493; 705/35

(58) Field of Classification Search .......... 235/380, 235/382, 449, 492, 493; 705/35, 41, 44
See application file for complete search history.

(56) References Cited

U.S. PATENT DOCUMENTS

| | | | | |
|---|---|---|---|---|
| 3,716,701 A * | 2/1973 | Cohen | ................. | 235/451 |
| 3,863,050 A * | 1/1975 | Brugger et al. | ............ | 235/380 |
| 4,326,123 A * | 4/1982 | Hosterman | ................. | 379/131 |
| 4,384,196 A * | 5/1983 | McCumber et al. | ......... | 235/375 |
| 4,573,711 A * | 3/1986 | Hyde | ................. | 283/98 |
| 5,095,194 A * | 3/1992 | Barbanell | ............. | 235/379 |
| 5,585,787 A * | 12/1996 | Wallerstein | ............ | 340/5.42 |
| 5,667,247 A * | 9/1997 | Ramsburg et al. | ......... | 283/61 |
| 6,000,608 A * | 12/1999 | Dorf | ................. | 235/380 |
| 6,224,108 B1 * | 5/2001 | Klure | ................. | 283/74 |
| 6,402,028 B1 * | 6/2002 | Graham et al. | ............ | 235/380 |
| 6,615,189 B1 * | 9/2003 | Phillips et al. | ............. | 705/41 |
| 7,128,261 B1 * | 10/2006 | Henderson et al. | .......... | 235/383 |
| 7,494,056 B2 * | 2/2009 | Sturm | ................. | 235/380 |
| 2004/0069845 A1 * | 4/2004 | Goldstein et al. | .......... | 235/380 |
| 2004/0143451 A1 * | 7/2004 | McIntyre et al. | ............ | 705/1 |
| 2007/0045401 A1 * | 3/2007 | Sturm | ................. | 235/380 |

OTHER PUBLICATIONS

Darko, Kendra L.; "gift subs: Hits, Misses and Testing Ideas (Gift Subscriptions can be profitable for a magazine; database modeling is just one method to develop donor files"; CM/Circulation Management, v.14, n.3; Mar. 1999; pp. 1-8.*
Business Wire; "Cubic Establishes New Corporate Office in Singapore"; Mar. 16, 2001; p. 1.*
Business Wire; "Datacard and Logica Form Partnership to Market Multi Application Smart Card Management"; Feb. 20, 2001. pp. 1 and 2.*

* cited by examiner

*Primary Examiner*—Ella Colbert
(74) *Attorney, Agent, or Firm*—Osha • Liang LLP

(57) ABSTRACT

A method for delivering a plurality of purchase cards includes obtaining the plurality of purchase cards from a retailer and loading the plurality of purchase cards into a plurality of purchase card feeders, activating and verifying each of the plurality of purchase cards associated with a user to obtain activated purchase cards, where activating and verifying occurs while each of the plurality of purchase cards are located on a conveyor leading from the plurality of purchase card feeders to a carrier sheet, placing the activated purchase cards on the carrier sheet, wherein the carrier sheet corresponds to the user receiving the activated purchase cards, and shipping the activated purchase cards to the user.

36 Claims, 7 Drawing Sheets

HIGH-SPEED AND HIGH-VOLUME ORDERING, MANUFACTURING/PACKAGING, AND DELIVERY OF PURCHASE CARDS

BACKGROUND

Purchase cards (e.g., gift cards, pre-paid credit or phone cards, medical care cards, etc.) are becoming more and more popular today as the use of traditional currency (i.e., cash, checks, etc.) is fading. Society is discovering that purchase cards are easier to manage than loose change or paper money. Today, purchase cards may even be ordered over the Internet and delivered straight to your house. Also, giving gifts using purchase cards arguably seems more thoughtful than just providing cash. In sum, the convenience of using a purchase cards has resulted in retailers and users finding new ways to use the purchase cards. Accordingly, millions of cards are being manufactured and delivered to customers demanding such cards. It appears this demand is only increasing.

Because the purchase cards are essentially treated as cash, extreme security measures surround the ordering, manufacturing, packaging, and delivery of such cards. As with any other sensitive type of transaction, the more people involved in the process and/or touching the purchase cards, the higher the threat of a security breach. Maintaining or improving the security measures surrounding the purchase cards is necessary to keep retailers and banking institutions interested in accepting the cards.

Also, to make the purchase cards an attractive alternative to traditional currency, the manufacturing, packing, and delivery must not only be done securely, but in a cost-effective and timely manner. Thus, the turnaround time from a user placing an order to receipt of a purchase card must be similar to the time it takes to acquire traditional currency.

SUMMARY

In general, in one aspect, the invention relates to a method for delivering a plurality of purchase cards. The method involves obtaining the plurality of purchase cards from a retailer and loading the plurality of purchase cards into a plurality of purchase card feeders, activating and verifying each of the plurality of purchase cards associated with a user to obtain activated purchase cards, wherein activating and verifying occurs while each of the plurality of purchase cards are located on a conveyor leading from the plurality of purchase card feeders to a carrier sheet, placing the activated purchase cards on the carrier sheet, wherein the carrier sheet corresponds to the user receiving the activated purchase cards, and shipping the activated purchase cards to the user.

In general, in one aspect, the invention relates to a purchase card delivery system. The system includes a user interface configured to allow a user to place an order for a purchase card, and a fulfillment center. The fulfillment center comprises a plurality of purchase card feeders configured to hold the purchase card from a retailer, and equipment configured to activate and verify the purchase card associated with the user to obtain the activated purchase card, wherein activating and verifying occurs while the purchase card is located on a conveyor leading from the plurality of purchase card feeders to a carrier sheet, place the activated purchase card on the carrier sheet, wherein the carrier sheet corresponds to the user receiving the activated purchase card, and ship the activated purchase card to the user.

In general, in one aspect, the invention relates to a computer readable medium. The computer readable medium comprises software instructions stored thereon for executing on a processor to perform: activating and verifying each of a plurality of purchase cards associated with a user to obtain activated purchase cards, wherein activating and verifying occurs while each of the plurality of purchase cards are located on a conveyor leading from the plurality of purchase card feeders to a carrier sheet, placing the activated purchase cards on the carrier sheet, wherein the carrier sheet corresponds to the user receiving the activated purchase cards, and shipping the activated purchase cards to the user, wherein the plurality of purchase cards are obtained from a retailer and the plurality of purchase cards are loaded into a plurality of purchase card feeders.

Other aspects of the invention will be apparent from the following description and the appended claims.

DETAILED DESCRIPTION

Figure 1:
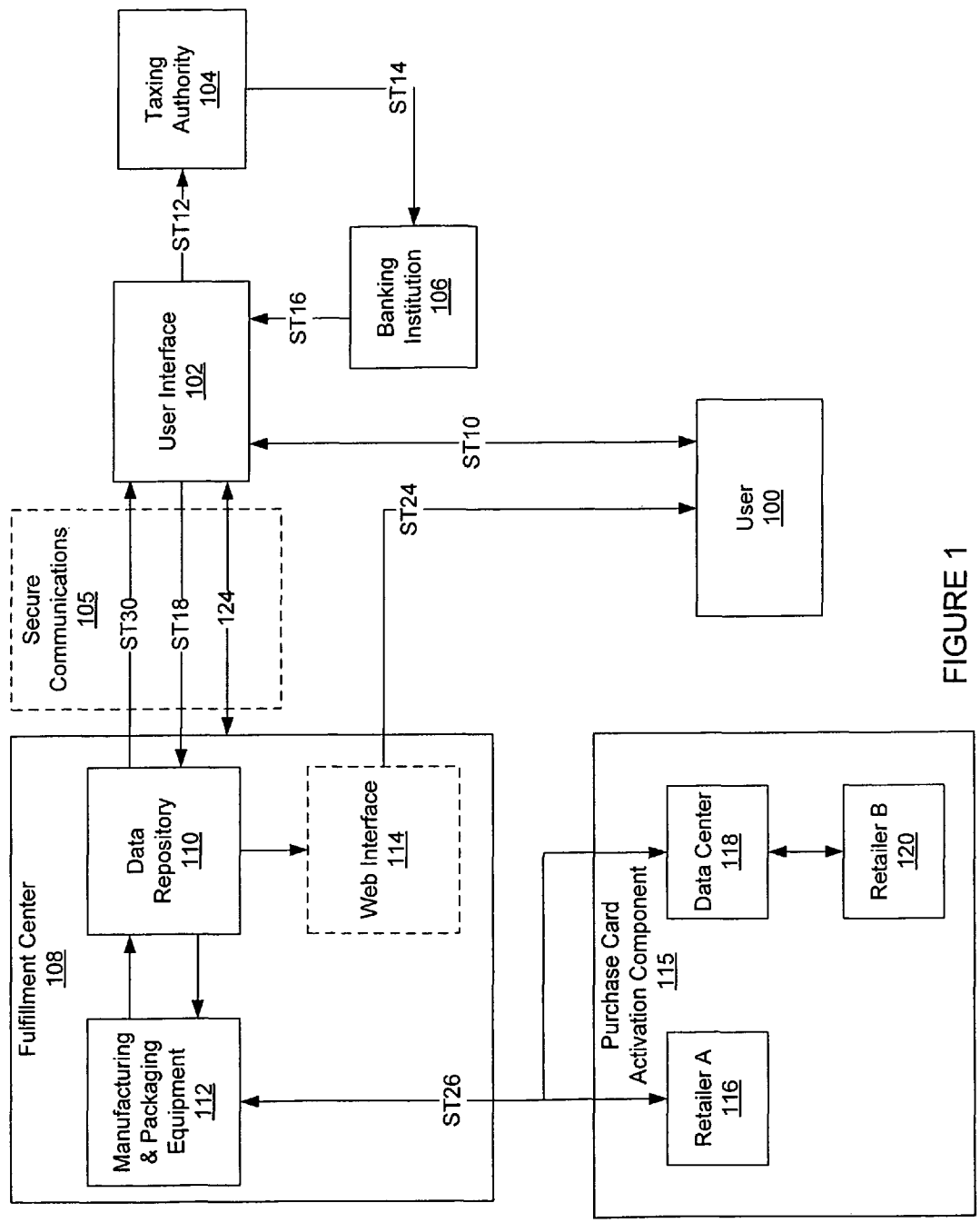
FIG. 1 shows a block diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for ordering, manufacturing/packaging, and delivering one or more purchase cards. A "purchase" card is a card that has some initial value usable for the purchase of goods and/or services from an entity that honors the card as a means for payment. For example, a gift card associated with a particular retailer is a form of a "purchase" card (e.g., a restaurant purchase card, a movie theater purchase card, a travel agency purchase card, etc.).

FIG. 1 shows a block diagram in accordance with one or more embodiments of the invention. While the example below uses the filing of a tax return as an example, those skilled in the art will appreciate that the invention includes any access of an user interface (i.e., a web site, a desktop application connected to a network, or other user interface(s)) that results in ordering, manufacturing/packaging, and delivering on or more purchase cards.

Initially, in ST10 of FIG. 1, a user 100 electronically files his/her tax return using a user interface 102, such as an on-line service. In one or more embodiments of the invention, the user 100 may be notified of acceptance of the tax return by the user interface 102 as part of ST10.

If the user 100 expects a tax refund, the user 100, at the time of filing with the user interface 102, may request all or part of the refund amount be distributed to him/her in the form of one or more purchase cards. In one or more embodiments of the invention, such a feature may be provided to the user 100 dependent on concurrent or future payment of a fee associated with the feature to the user interface 102. The fee for using the feature to purchase cards is intended to be small enough to avoid being a barrier to the service, but high enough to help defray some of the fixed costs associated with offering such a service.

The user interface 102, possibly having checked the user's tax return for errors, electronically files the tax return with the relevant taxing authority 104 in ST12. Once the tax return is verified and approved by the taxing authority 104, a refund amount may be funded to a banking institution 106 in the name of the user 100 in ST14. In one or more embodiments of the invention, the banking institution 106 may be designated by the user interface 102. In one or more other embodiments of the invention, the banking institution 106 may be designated by the user 100. In one or more embodiments of the invention, this communication with the taxing authority 104 and/or banking institution 106 is transmitted in a secure manner.

Upon funding by the taxing authority 104 in ST14, the banking institution 106 notifies the user interface 102 of the funding in ST16. The amount of funding indicated to the user interface 102 as being available for the potential procurement of purchase cards requested by the user 100 may have been reduced by, for example, any tax return filing fees owed by the user 100, any further taxes owed by the user 100, and any fees associated with the actual procurement of the requested purchase cards (e.g., fees due a retailer for activation/use of their purchase card). At this point, the user 100 is able to determine how much of the available funding amount to allocate to the one or more of the different types of purchase cards available (e.g., movie purchase cards, travel purchase cards, department store purchase cards, specialty card purchase cards, or other purchase cards tied to a particular retailer or group of retailers). Further, the user 100 is able to determine exactly how much money is to be allocated to each of these purchase cards (discussed in detail below). One skilled in the art will appreciate that all or just a fractional portion of the available funding may be allocated to purchase cards, with the remainder being used in various other manners (e.g., deposited to a savings account, used for paying off credit card balances, used to buy a new car, etc.)

After verification of the funding amount available for the procurement of purchase cards requested by the user 100, the user interface 102 generates an order to a fulfillment center 108 in ST18. The order may contain such information as, for example, the types and amounts of purchase cards to be delivered to the user 100. The fulfillment center 108 may have a data repository 110 that receives the order from the user interface 102. In ST20, the data repository 110 relays the order to manufacturing and packaging equipment 112 responsible for the manufacturing and packaging of requested purchase cards. Moreover, in ST22, the data repository 110 may optionally relay data associated with the order to a web interface 114, which can then be accessed in ST24 to provide the user 100 with a status of his/her purchase card order.

Concurrent with or after the manufacturing and packaging of requested purchase cards corresponding to a particular order, in ST26, activation data is sent to a purchase card activation component 115 where the information is passed to those entities authorized to respectively activate each of the requested purchase cards. For example, as shown in FIG. 1, activation data may be sent to Retailer A 116 directly or to a data center 118 used by a Retailer B 120. The activation data includes information for identifying and/or characterizing purchase cards that have been manufactured and packaged by the fulfillment center 108. Within the fulfillment center 108, the purchase card(s) are activated and verified using the activation data while on a conveyor of the manufacturing and packaging equipment 112 in accordance with one or more embodiments of the invention, which is described below in relation to FIGS. 4-6.

Upon completion of manufacturing and packaging purchase cards for delivery for a particular order, a job completion notification is sent to the data repository 110 in ST28. In one or more embodiments of the invention, the job completion notification may not be sent until the requested purchase cards for a particular order have been actually shipped out to the user 100 by the fulfillment center 108. In some cases, shipping may be delayed waiting for completion of the activation and verification process. For purchase cards for some retailers, this process could take as long as twenty-four hours. Once the order has been completed, fulfillment center 108, in ST30, reports the order/ship confirmation to the user interface 102. Thereafter, the user interface 102 may take action to (at least tentatively) close the user's purchase card order.

In one or more embodiments of the invention, communication between the user interface 102 and the fulfillment center 108 may occur via a secure connection 105. Those skilled in the art will note that the secure connection 105 may be provided by a service specializing in establishing and maintaining secure communication channels between two or more business entities.

Further, those skilled in the art will note that in one or more embodiments of the invention, additional acknowledgement information 124 may be communicated between the user interface 102 and the fulfillment center 108 via the secure connection 105. Such acknowledgement information 124 may include action information, timing information, error information, and synchronization information.

By way of example, it is well known that various governmental entities require individuals to file tax returns on some regular basis. For example, the United States government, via the Internal Revenue Service ("IRS"), requires residents to annually file income tax returns.

The traditional manner of preparing and filing a tax return generally involves: (i) obtaining necessary tax return documents (e.g., tax return forms, preparation instructions, tax schedules) from, for example, the taxing authority directly or a location (e.g., a post office) designated as having tax return documents, (ii) preparing the tax return using, for example, a tax preparation software package, and (iii) postal mailing the tax return and other necessary documents to the taxing authority. If a taxpayer determines that he/she owes money to the taxing authority, then the taxpayer includes a payment (e.g., a check) or an authorization for payment (e.g., an authorization to charge the taxpayer's credit card) with the tax return. However, if the taxpayer determines that he/she is owed a refund, such is indicated on the tax return, and after processing and verification of the tax return by the taxing authority, the taxing authority traditionally mails a refund check to the taxpayer.

While filing a tax return by postal mail and then possibly receiving a refund check in the mail remains a preferred option for most taxpayers, the wide availability and use of the Internet has significantly changed how tax returns on the whole are filed. Various user interfaces and tax preparation software packages are available that enable a taxpayer to file his/her tax return over the Internet. Filing a tax return on-line often results in a turnaround time for receiving a refund that is typically shorter than with filing a tax return by postal mail. Moreover, the form of the refund may be, for example, any one of a refund check sent by postal mail to the taxpayer, an electronic deposit to a taxpayer's bank account (e.g., a checking or savings account), and an application of all or part of the refund amount to a future tax period.

In one or more embodiments of the invention, a user may be provided with an incentive to request one or more purchase cards as opposed to receiving payment by check or electronic deposit. For example, a taxpayer owed US$200 as his/her tax refund may request and receive a purchase card with an initial value of US$230, representing a 15% increase over the tax refund amount due the taxpayer. Not only does this benefit a taxpayer as his/her tax refund is provided with increased value, an entity honoring the purchase card as a means for payment obtains the business of the taxpayer.

Further, in one or more embodiments of the invention, there is a minimum number of purchase cards that must be requested in order to receive benefits associated with obtaining one or more purchase cards. Moreover, in one or more embodiments of the invention, there may be a minimum value as to the amount of a requested purchase card. Moreover, in one or more embodiments of the invention, there may be a minimum as to the total value of purchase cards that must be requested in order to receive benefits associated with obtaining the purchase cards. Further, in one or more embodiments of the invention, there may be a maximum as to the number of purchase cards that may be requested and a maximum value as to the amount of a requested purchase card. Moreover, in one or more embodiments of the invention, there may be a maximum as to the total value of purchase cards that may be requested.

Those skilled in the art will note that while the description above regarding ordering, manufacturing/packaging and delivery of purchase cards is in the context of tax refunds, ordering, manufacturing/packaging, and delivery of purchase cards in accordance with one or more embodiments of the invention may be completely separate from the distribution of tax refunds. For example, in one or more embodiments of the invention, a single user interface may enable a user to buy various different purchase cards, where the ordering, manufacturing/packaging, and delivery of the purchase cards is handled according to one or more of the various manners described above. Accordingly, the above example should not limit the scope of the invention.

Figure 2:
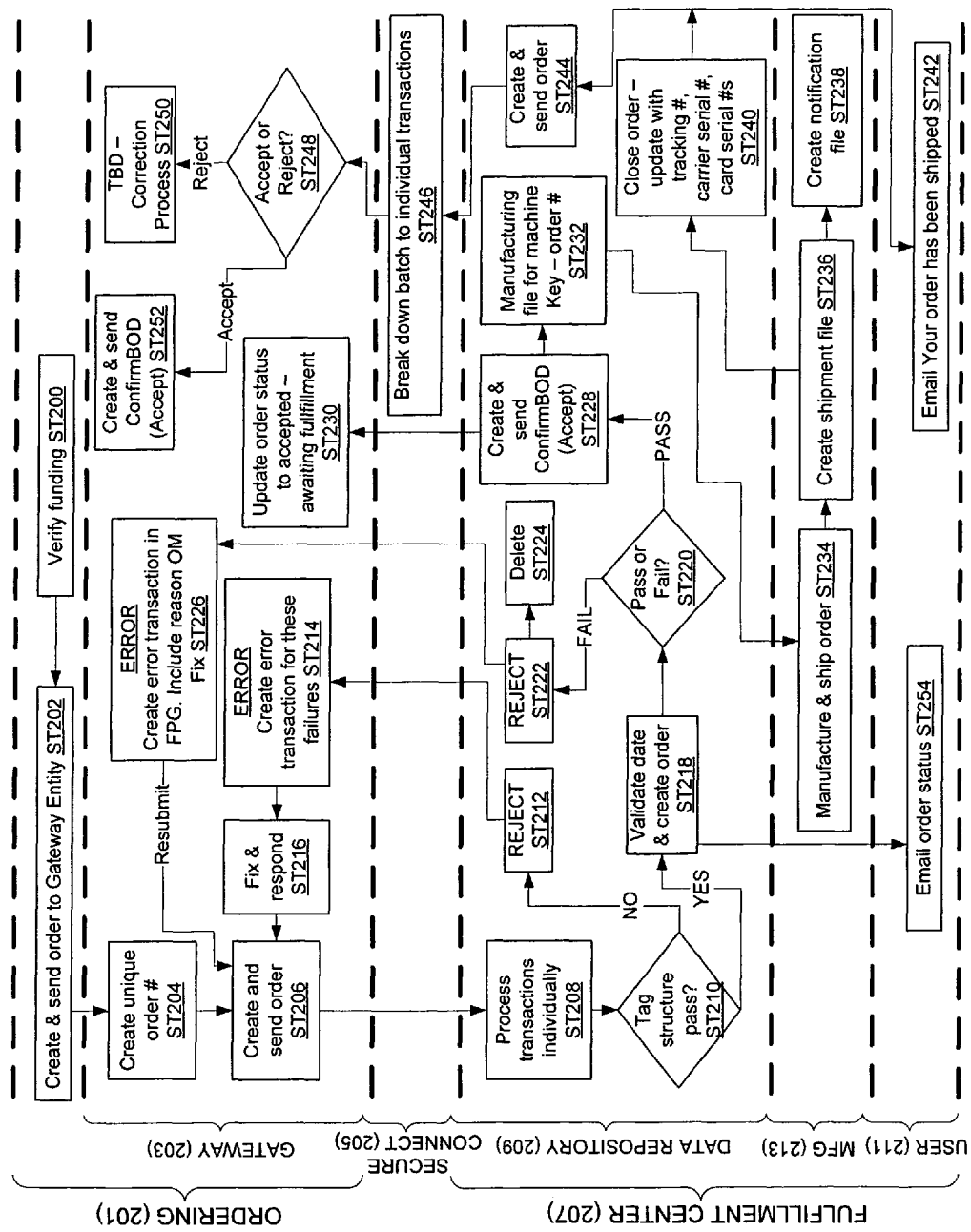
FIG. 2 shows a flow process in accordance with one or more embodiments of the invention.

FIG. 2 shows a data flow process in accordance with one or more embodiments of the invention. Particularly, FIG. 2 shows a flow diagram for handling an order for purchase cards. Upon verifying funding ST200 (with the banking institution 106 in FIG. 1), an ordering entity 201 (e.g., user interface 102 in FIG. 1), in ST202, creates and sends an order for one or more requested purchase cards to a gateway entity 203 that may be part of the ordering entity 201. The gateway entity 203 may, among other things, create a unique order number for the order ST204. Thereafter, the gateway entity 203 creates and sends the order over a secure connection 205 to a fulfillment center 207 as a group of transactions for each requested purchase card ST206. In one or more embodiments of the invention, the gateway entity 203 may send the order as an XML-based communication.

In ST208, a data repository entity 209 that is part of the fulfillment center 207 individually processes each of the transactions sent as part of the order from the gateway entity 203. If the structure of the order is determined as failing ST210, the data repository entity 209 rejects the order ST212 and notifies the gateway entity 203. In this case, the gateway entity 203, in ST214, creates an error transaction for a portion of the gateway entity 203 responsible for monitoring the failure of the structure of orders sent to the data repository entity 209. Thereupon, the cause of the error is fixed ST216, and the gateway entity 203 resends the order ST206.

When and if the data repository entity 209 determines a structure of the order sent by the gateway entity 203 as passing ST210, the data repository entity 209 attempts to validate the data of the order and creates a corresponding order ST218. At this point, a user 211 may be provided with a status of his/her order ST220 via, for example, e-mail. If the data of the order cannot be validated ST220, the data repository entity 209 rejects the order ST222, deletes the order ST224, and notifies the gateway entity 203. In this case, the gateway entity 203 creates an error transaction for a portion of the gateway entity 203 responsible for the error and then fixes the error ST226. Thereupon, the gateway entity 203 resends the order ST206.

When and if the data repository entity 209 validates the data of the order ST220, the order is accepted ST228. At this point, a message may be sent to the gateway entity 203, in which case, the gateway entity 203 will reflect that the order is awaiting fulfillment ST230. Once the order is accepted by the gateway entity 209 in ST228, a manufacturing file is generated for a machine entity 213 (as shown in FIGS. 4-6 and described below) that will manufacture and package the purchase cards of the order ST232.

Figure 4:
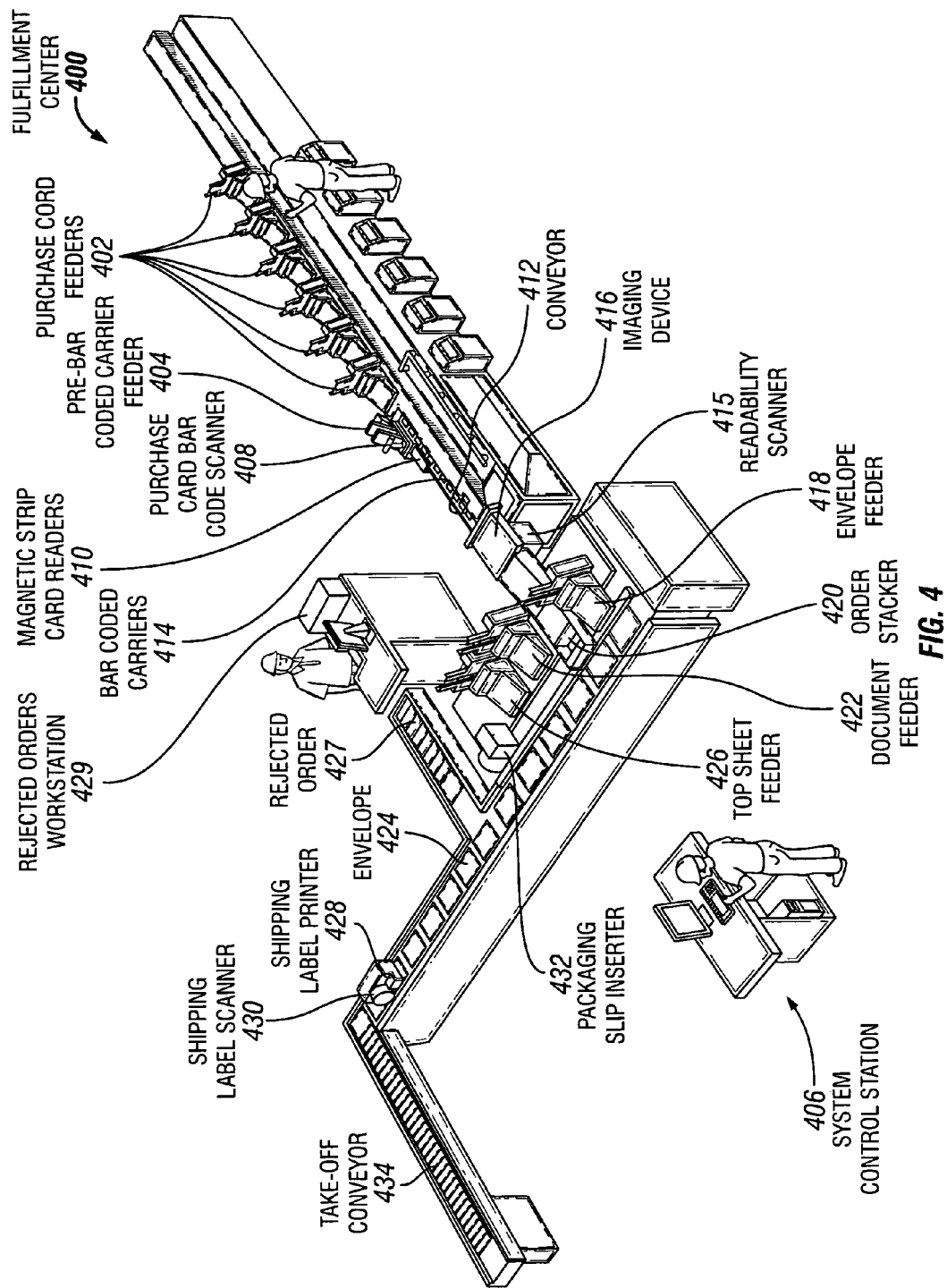
FIGS. 4-7 show a variety of systems in accordance with one or more embodiments of the invention.
Figure 5:
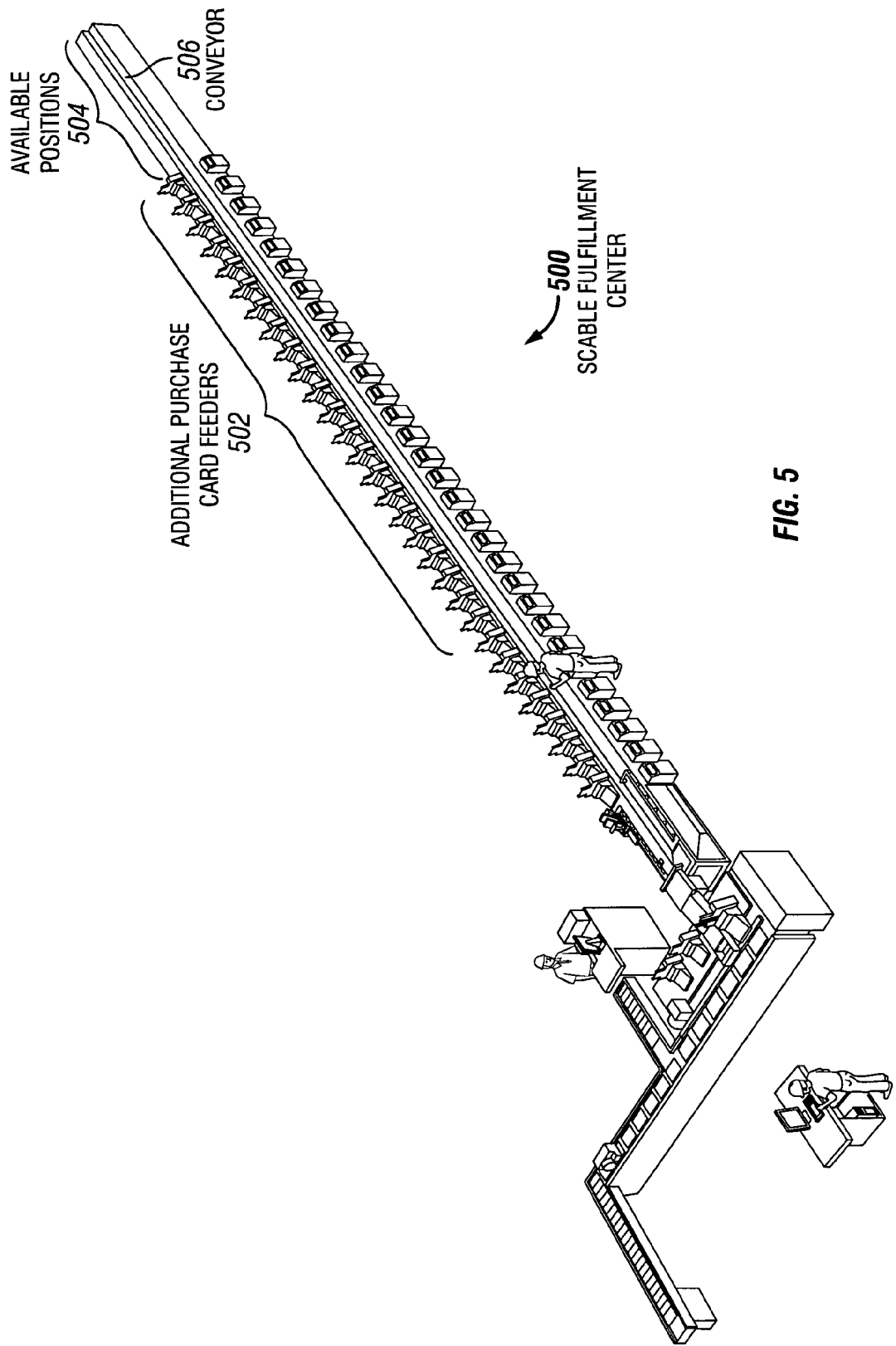
Figure 6:
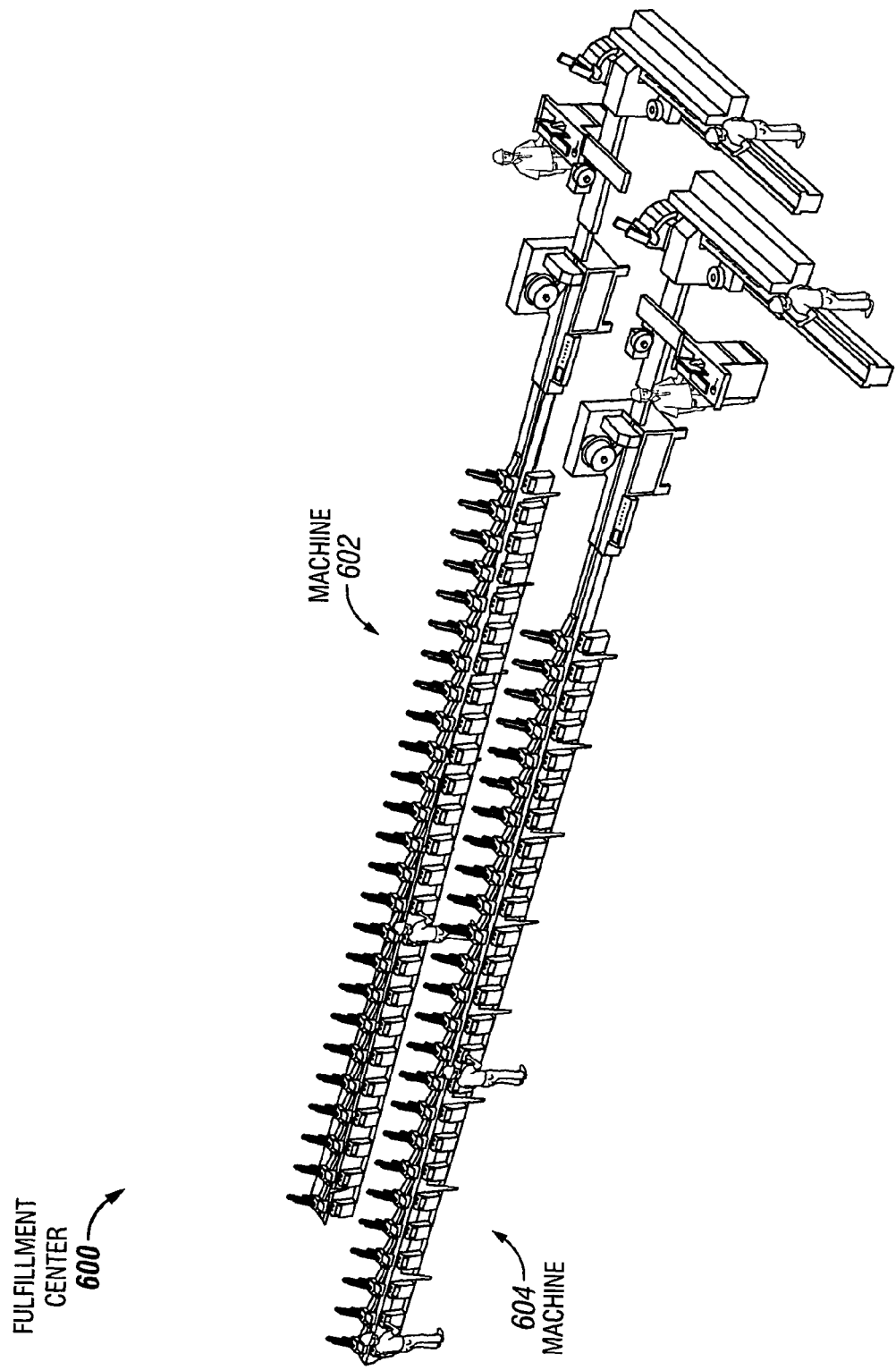

The manufacturing file generated in ST232 is used by the machine entity 213 to manufacture and package the requested purchase cards (as shown in FIGS. 4-6 and described below), which are subsequently shipped out ST234. In one or more embodiments of the invention, payment for the shipment of the purchase cards may be remitted by the ordering entity 201.

Upon shipping the order in ST234, a shipment file is created ST236, which is then used as part of an activation file that is sent to those entities authorized and able to activate the purchase cards constituting the shipped order ST238. Moreover, the shipment file created in ST236 is sent to the data repository entity 203, which then closes the order, updates the order status with, for example, a tracking number for the shipment, the serial number of a carrier on which one or more shipped purchase cards are attached, and the serial numbers of the shipped purchase cards ST240. At this point, an order status update may be sent to the user ST242 via, for example, a web interface. Moreover, in ST244, the order, represented as a group of shipped transactions, is sent back to the gateway entity 203 from the data repository entity 209.

In one or more embodiments of the invention, the order sent back to the gateway entity 203 may be broken down into individual transactions by the secure connection 205 in ST246. If the individual transactions are accepted by the gateway entity 203 in ST248, then the shipped order is accepted ST252. Otherwise, if the individual transactions are not accepted by the gateway entity 203 in ST248, the shipped order is rejected and a correction process is invoked ST250.

Figure 3:
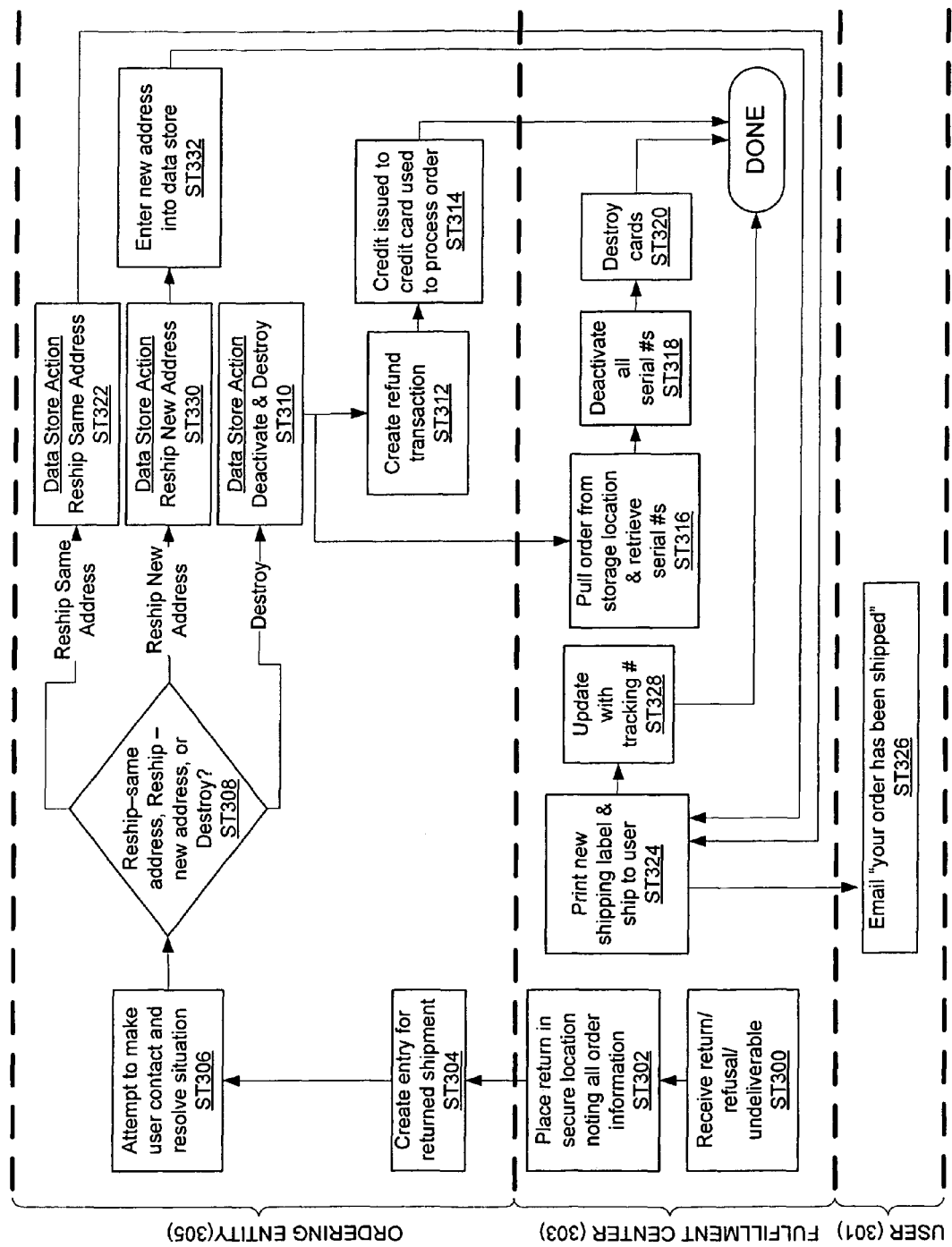
FIG. 3 shows a flow process in accordance with one or more embodiments of the invention.

In some cases, a shipment of an order of requested purchase cards may be returned. For example, a shipment may be returned by the shipper as being refused or undeliverable. FIG. 3 shows a flow process for handling a returned shipment in accordance with one or more embodiments of the invention. Once a shipped order is returned to a fulfillment center 303 in ST300, the returned package is stored in a secure location with corresponding order information ST302. In one or more embodiments of the invention, the returned package may be stored in the packaging used to originally ship the package to a user 301.

Notice of the returned shipment and corresponding order information is recorded by an ordering entity 305 in ST304. The ordering entity 305, in ST306, may attempt to contact the user 301 to obtain corrected shipping information or otherwise resolve any conflict with the user 301. Thereafter, in ST308, a determination is made as to whether to (i) destroy the returned package, (ii) reship the returned package to the same address the package was originally shipped to, or (iii) reship the returned package to an address different from the one the package was originally shipped to.

If it is decided that the returned package is to be destroyed, the purchase cards forming the order in the returned package are indicated by the ordering entity 305 as being deactivated and destroyed ST310. Thereafter, a refund transaction is created ST312, and a credit is issued to the user 301 in ST314. The deactivation of the purchase cards may be achieved by retrieving the returned package from the fulfillment center 303 in ST316, and then, in ST318, deactivating all the serial numbers of the purchase cards in the retrieved returned package. The purchase cards are then physically destroyed ST320.

If it is decided that the returned package is to be reshipped to the same address, the order is indicated by the ordering entity 305 as being reshipped to the same address ST322. In this case, in ST324, a new shipping printing label may be attached to the returned package, and then, the package is shipped out to the user 301. Upon shipment, an order status update may be sent to the user 301 in ST326. Moreover, at this point, the ordering entity 305 may be updated with the tracking number of the shipped order ST328.

If it is decided that the returned package is to be reshipped to a different address, the order is indicated by the ordering entity 305 as being reshipped to a different address ST330. In this case, in ST332, the new address is stored by the ordering entity 305. At this point, in ST324, a new shipping printing label is attached to the returned package, and then, the package is shipped out to the user 301. Upon shipment, an order status update may be sent to the user 301 in ST326. Moreover, at this point, the ordering entity 305 may be updated with the tracking number of the shipped order ST328.

As described above, a fulfillment center may be configured to prepare, package, and deliver requested purchase cards. FIG. 4 shows an exemplary fulfillment center 400 in accordance with one or more embodiments of the invention. Initially, the purchase card(s) is obtained from a retailer and securely stored (not shown). In one or more embodiments of the invention, the purchase card(s) at this point is not activated or validated. The purchase cards are loaded into one or more purchase card feeders 402. Each of these purchase card feeders 402 may be controlled automatically or by control of an operator at a system control station 406 to selectively dispense purchase cards as needed to fill particular orders.

Purchase cards dispensed from purchase card feeders 402, while traveling along a conveyor, are sent across bar code scanners 408 and magnetic stripe readers 410 in order to store information associated with each dispensed purchase card. Further, while traveling along the conveyor, the purchase cards are activated and verified, as discussed above.

Carriers (i.e., sheets to which a certain number of purchase cards are attached) are delivered by conveyor 412, whereupon groups of dispensed and scanned/read purchase cards from the purchase card feeders 402 are attached to bar coded carriers 414. In one or more embodiments of the invention, the carriers are pre-bar coded and stored in a pre-bar coded carrier feeder 404 located next to the conveyor and after the selective purchase card feeders 402. The pre-bar coded carrier feeder 404 places the bar coded carriers 414 on the conveyer in condition to accept the purchase cards. These bar coded carriers may be initially scanned for readability by a scanner 415. In one or more embodiments of the invention, the bar coded carrier 414 is able to carry six purchase cards (i.e., 3 rows and 2 columns of purchase cards). However, depending on implementation, the bar coded carrier 414 can hold more or less purchase cards, as necessary. Further, while the carriers are described a bar coded, any identifying image (e.g., a bar code, a holographic image, a serial number, etc.) may be used and this example should not limit the invention.

Each bar coded carrier 414 is individually imaged by an imaging device 416, such as a scanner, with the activated purchase cards to store identification information for each carrier. The image is then associated with the order and stored.

The bar coded carriers 414 are stacked by an order stacker 420 upon an envelope fed by envelope feeder 418. In one or more embodiments of the invention, a promotional product/disclosure document may be inserted onto the stack of carriers by document feeder 422. Further, a top sheet for the order (e.g., a letter to the customer) is placed on the stack of carriers by top sheet feeder 426.

Once the carriers for a particular order have been stacked onto an envelope, the order stack is then inserted into the envelope 424. Thereafter, a packaging slip is prepared and inserted into to the envelope 424 by a packaging slip inserter 432. Next, a shipping label is printed by the shipping label printer 428. In one or more embodiments of the invention, the shipping label is then affixed to the envelope 424 also by the shipping label printer 428. Finally, the envelope 424, with the shipping label affixed, is then scanned by the shipping label scanner 430, and the orders are then taken off of a take-off conveyor 434 for shipping. Further, in one or more embodiments of the invention, prior to applying the shipping label 428, rejected orders 427 may be intercepted and processed at rejected orders workstation 429. In one or more embodiments of the invention, the actions described above may all be performed automatically (i.e., without the interaction of a human).

The system control station 406 may be used to control any aspect or operation of the fulfillment center 400. For example, an operator at the system control station 406 may control a speed of inserting carriers holding the purchase cards into respective envelopes.

Those skilled in the art will note that a delivery system in accordance with one or more embodiments of the invention is scalable so as to allow for additional purchase card feeders with relative ease. For example, FIG. 5 shows a scalable fulfillment center 500 having additional purchase card feeders 502 relative to the system shown in FIG. 4. However, while having additional capacity and throughput, the fulfillment center 500 is designed to have the same functionality as the fulfillment center 400 in FIG. 4. Moreover, as discernible from FIG. 5, scalable fulfillment center 500 has available positions 504 for the placement of additional purchase card feeders (not shown). The additional purchase card feeders are designed to be interchangeable and on-line almost immediately upon placing the feeder along the conveyor 506.

FIG. 6 shows a configuration of the fulfillment center 600 where two separate machines 602, 604 may be arranged in tandem to increase productivity and volume. Each machine 602, 604 is designed to have the same functionality as the fulfillment center 400 in FIG. 4. However, with the machines 602, 604 in tandem, the fulfillment center 600 has built in redundancy and twice the potential capacity.

In one or more embodiments of the invention, a high volume of purchase cards may be rapidly manufactured, packaged, and shipped. In one or more embodiments of the invention, an on-line tax preparation and filing service may provide taxpayers with the ability to order purchase cards as part or all of any tax refunds.

In one or more embodiments of the invention, a high-speed, high-volume purchase card system may be scalable to allow for additional purchase card feeds. In one or more embodiments of the invention, a high-speed, high-volume purchase card system may be configured to filter out rejected purchase cards. In one or more embodiments of the invention, a technique for ordering, manufacturing/packaging, and delivering purchase cards to numerous users is capable of handling returned packages.

Figure 7:
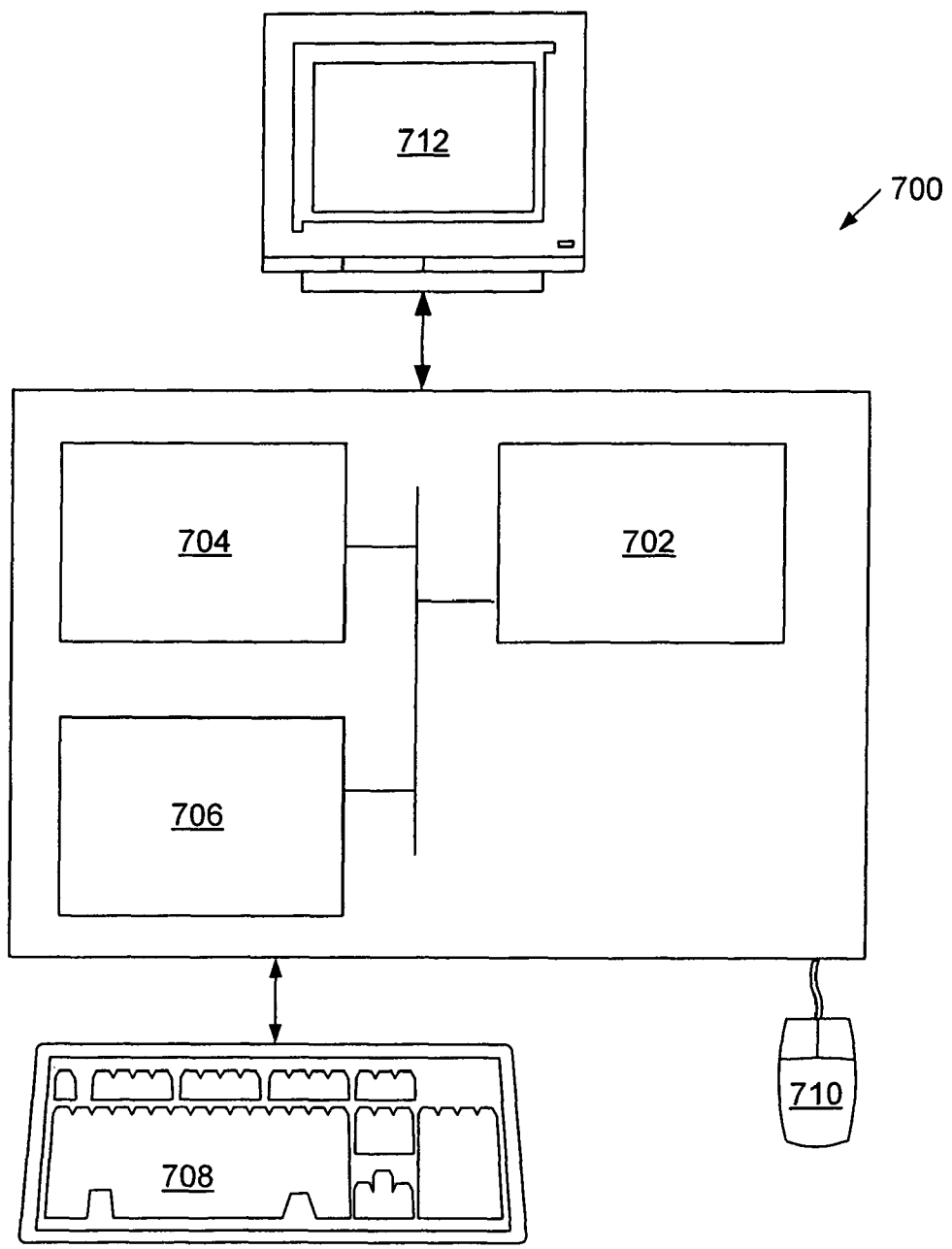

The invention may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention (e.g., user interface, purchase card activation logic, web interface, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for delivering a plurality of purchase cards, comprising:
   obtaining the plurality of purchase cards from a retailer and loading the plurality of purchase cards into a plurality of purchase card feeders;
   activating and verifying each of the plurality of purchase cards associated with a user to obtain activated purchase cards while each of the plurality of purchase cards are located on a conveyor leading from the plurality of purchase card feeders to a carrier sheet;
   placing the activated purchase cards on the carrier sheet after activating and verifying each of the plurality of purchase cards on the conveyor, wherein the carrier sheet corresponds to the user receiving the activated purchase cards; and
   shipping the activated purchase cards to the user after the activated purchase cards are placed on the carrier sheet.

2. The method of claim 1, further comprising:
   receiving an order for the plurality of purchase cards from the user.

3. The method of claim 2, wherein the carrier sheet comprises an identifying image corresponding to the order for the plurality of purchase cards.

4. The method of claim 3, wherein the identifying image comprises at least one from a group consisting of a bar code, a holographic image, and a serial number.

5. The method of claim 2, wherein the order is placed contemporaneously with the filing of a tax return.

6. The method of claim 2, further comprising:
   coordinating delivery of activated purchase cards with a governmental entity, a banking institution, and the user.

7. The method of claim 2, wherein the user receives electronic updates of a status of the order.

8. The method of claim 2, further comprising:
   pre-processing the order to organize the plurality of purchase cards dispensed from the plurality of purchase card feeders according to the user.

9. The method of claim 8, wherein the order comprises individual transactions.

10. The method of claim 1, further comprising:
    imaging the carrier sheet comprising the activated purchase cards while on the conveyor and prior to shipping the activated purchase cards.

11. The method of claim 1, further comprising:
    imaging a shipping label associated with the carrier sheet while on the conveyor and prior to shipping the activated purchase cards.

12. The method of claim 1, wherein the plurality of purchase cards are valued greater than the amount paid by the user.

13. The method of claim 1, wherein the carrier sheet holds five or more activated purchase cards.

14. The method of claim 1, wherein activating and verifying each of the plurality of purchase cards, comprises secure communications with at least one from a group consisting of a banking institution, a governmental entity, a taxing authority, a retailer, and a user.

15. The method of claim 1, further comprising:
    receiving a returned order of activated purchase cards.

16. The method of claim 15, further comprising:
    reshipping the returned order upon resolution with the user.

17. The method of claim 15, further comprising:
    de-activating and destroying activated purchase cards included in the returned order.

18. The method of claim 1, further comprising:
    re-processing rejected orders based on a pre-defined rejection code.

19. A purchase card delivery system comprising:
    a user interface configured for a user to place an order for a purchase card; and
    a fulfillment center comprising:
        a plurality of purchase card feeders configured to hold the purchase card from a retailer, and
        equipment configured to:
            activate and verify the purchase card associated with the user to obtain the activated purchase card while the purchase card is located on a conveyor leading from the plurality of purchase card feeders to a carrier sheet,
            place the activated purchase card on the carrier sheet after activating and verifying each of the plurality of purchase cards on the conveyor, wherein the carrier sheet corresponds to the user receiving the activated purchase card, and
            ship the activated purchase card to the user after the activated purchase cards are placed on the carrier sheet.

20. The system of claim 19, further comprising equipment configured to:
  receive an order for the purchase card from the user.

21. The system of claim 20, wherein the carrier sheet comprises an identifying image corresponding to the order for the purchase card.

22. The system of claim 21, wherein the identifying image comprises at least one from a group consisting of a bar code, a holographic image, and a serial number.

23. The system of claim 20, wherein the order is placed contemporaneously with the filing of a tax return.

24. The system of claim 20, further comprising equipment configured to:
  coordinate delivery of activated purchase card with a governmental entity, a banking institution, and the user.

25. The system of claim 20, wherein the user receives electronic updates of a status of the order.

26. The system of claim 20, further comprising equipment configured to:
  pre-process the order to organize the purchase card dispensed from the plurality of purchase card feeders according to the user.

27. The system of claim 26, wherein the order comprises individual transactions.

28. The system of claim 19, further comprising equipment configured to:
  image the carrier sheet comprising the activated purchase card while on the conveyor and prior to shipping the activated purchase card.

29. The system of claim 19, further comprising equipment configured to:
  image a shipping label associated with the carrier sheet while on the conveyor and prior to shipping the activated purchase card.

30. The system of claim 19, wherein the purchase card is valued greater than the amount paid by the user.

31. The system of claim 19, wherein the carrier sheet holds five or more activated purchase cards.

32. The system of claim 19, wherein activating and verifying each of the plurality of purchase cards, comprises secure communications with at least one from a group consisting of a banking institution, a governmental entity, a taxing authority, a retailer, and a user.

33. The system of claim 19, further comprising equipment configured to:
  receive a returned order of the activated purchase card.

34. The system of claim 33, further comprising equipment configured to:
  reship the returned order upon resolution with the user.

35. The system of claim 33, further comprising equipment configured to:
  de-activate and destroy the activated purchase card included in the returned order.

36. The system of claim 19, further comprising equipment configured to:
  re-process rejected orders based on a pre-defined rejection code.

* * * * *